(12) United States Patent
Weigold et al.

(10) Patent No.: US 7,919,899 B2
(45) Date of Patent: Apr. 5, 2011

(54) ELECTRICAL MACHINE

(75) Inventors: Thomas Weigold, Bamberg (DE);
Christian Schneider, Lauf (DE);
Andreas Saum, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/280,909

(22) PCT Filed: Jan. 18, 2007

(86) PCT No.: PCT/EP2007/050483
§ 371 (c)(1),
(2), (4) Date: Aug. 27, 2008

(87) PCT Pub. No.: WO2007/104591
PCT Pub. Date: Sep. 20, 2007

(65) Prior Publication Data
US 2009/0009023 A1     Jan. 8, 2009

(30) Foreign Application Priority Data
Mar. 14, 2006 (DE) .......................... 10 2006 011 547

(51) Int. Cl.
*H02K 13/00* (2006.01)
*H02K 21/00* (2006.01)
*H02K 23/20* (2006.01)
*H02K 13/12* (2006.01)
*H01R 39/04* (2006.01)
*H01R 39/18* (2006.01)

(52) U.S. Cl. ........ 310/251; 310/198; 310/210; 310/233; 310/248; 310/229

(58) Field of Classification Search .................. 310/225, 310/248, 251
See application file for complete search history.

(56) References Cited

U.S. PATENT DOCUMENTS
3,733,506 A    5/1973   Jaffe et al.
(Continued)

FOREIGN PATENT DOCUMENTS
EP    1 220 428 A1    7/2002
(Continued)

OTHER PUBLICATIONS

English equivalent WO2005076442 on US PG Pub 20070188040.*

*Primary Examiner* — Quyen Leung
*Assistant Examiner* — Jose A Gonzalez Quinones
(74) *Attorney, Agent, or Firm* — Ronald E. Greigg

(57) ABSTRACT

The invention describes an electrical machine having an armature with armature slots for accommodating armature coils. At least one armature coil is formed from two coil elements which are arranged symmetrically with respect to one another in relation to an axis of symmetry, which runs through the center-point of the armature shaft. The coil elements are connected to two adjacent commutator laminates of a commutator. A first brush, a second brush and a third brush bear against the commutator in a manner such that they can slide. The second brush interacts with the first brush or the third brush. The third brush is arranged in relation to the two coil elements in such a way that, when the two adjacent commutator laminates come into contact with one another, the third brush and the center-point of the armature shaft form an axis which has an angle of 90 DEG–(180 DEG/number of laminates)–(180 DEG/3×number of laminates) up to 90 DEG+(180 DEG/number of laminates)+(180 DEG/3×number of laminates) in relation to the axis of symmetry of the two coil elements.

18 Claims, 1 Drawing Sheet

U.S. PATENT DOCUMENTS

| | | | |
|---|---|---|---|
| 5,594,290 A * | 1/1997 | Shannon et al. | 310/251 |
| 7,567,007 B2 * | 7/2009 | Furui | 310/198 |
| 2002/0105294 A1 | 8/2002 | Harada et al. | |
| 2005/0218750 A1 | 10/2005 | Suminski et al. | |
| 2007/0188040 A1 * | 8/2007 | Kawashima et al. | 310/225 |

FOREIGN PATENT DOCUMENTS

| | | |
|---|---|---|
| WO | WO 2005/076442 A1 | 8/2005 |
| WO | WO 2005076442 A1 * | 8/2005 |

* cited by examiner

ELECTRICAL MACHINE

CROSS-REFERENCE TO RELATED APPLICATION

This application is a 35 USC 371 application of PCT/EP 2007/050483 filed on Jan. 18, 2007.

BACKGROUND OF THE INVENTION

1. Field of the Invention

The invention relates to an electrical machine, in particular a direct current machine.

2. Description of the Prior Art

From International Patent Disclosure WO 2005/076442 A, an electric motor with a symmetrically disposed armature winding is known. The symmetrically disposed armature winding comprises a first coil that is wound between two arbitrary armature slots and is electrically contacted at adjacent commutator laminations. A second coil is wound between two armature slots that are in a point-symmetrical position relative to the two armature slots of the first coil, with respect to the center point of the armature shaft and is wound in the opposite direction. In the motor, the number of armature slots is equal to the number of commutator laminations. The motor has one brush each for high and low speeds as well as one common brush. The first and second coils are disposed in such a way that they are located in a symmetrical position to an axis that passes through the center point of the brush for high speeds and the center point of the rotary shaft when the brush for high speeds comes into contact with the adjacent commutator lamination and as a result short-circuits the first coil to the second coil.

The disposition of the brushes with respect to the first and second coils that are symmetrical to one another as in WO 2005/076442 has the disadvantage that one circuit conductor of each coil leads directly from the armature slot to the commutator. The term switching conductor is understood to mean that portion of a coil wire that leads from the coil to the commutator. This means that this switching conductor is fastened quasi-freely between the coil and the commutator hook. The fastened switching conductor thus blocks the space for the following switching conductors of the other coils. The result is a large winding head construction and possibly breakage at the commutator hook of the fastened switching conductor under vibrational stress, which can cause field failures.

SUMMARY AND ADVANTAGES OF THE INVENTION

The electrical machine according to the invention includes an armature with armature slots for receiving armature coils. At least one armature coil is formed of two partial coils, disposed symmetrically to one another relative to an axis of symmetry that passes through the center point of the armature shaft of the armature, and the partial coils are connected to adjacent commutator laminations of a commutator. This means that the armature coils are embodied in such a way that each two partial coils are disposed symmetrically to one another with respect to an axis of symmetry that passes through the center point of the axis of rotation of the armature. The two partial coils disposed symmetrically to one another are connected to two adjacent commutator laminations of a commutator. The electrical machine furthermore includes a first brush, a second brush, and a third brush, which rest slidably on the commutator, and the second brush cooperates with the first brush or with the third brush. According to the invention, the third brush is disposed relative to the two partial coils in such a way that when the two adjacent commutator laminations are contacted electrically, the third brush and with the center point of the axis of rotation form an axis that forms an angle, relative to the axis of symmetry of the two partial coils, of from 90°−(180°/number of laminations)−(180°/3·number of laminations)

to

90°+(180°/number of laminations)+(180°/3·number of laminations), where the term number of laminations is understood to mean the number of commutator laminations.

If the number of laminations is for instance 12, then the angle is within a range of from 90°−15°−5° to 90°+15°+5°, preferably in the range of from 90°−15°−4° to 90°+15°+4°, and especially preferably of from 90°−15°−2° to 90°+15°+2°. The angle is for instance 90°+15°±4°.

According to the invention, the axis that passes through the third brush and the center point of the axis of rotation, when the third brush makes electrical contact with the two adjacent commutator laminations, so that the two partial coils short-circuited, is substantially perpendicular, or in other words at 90°, to the axis of symmetry of the two partial coils.

The two switching conductors of the two symmetrical partial coils connected in series, or the four switching conductors of two partial coils connected parallel, are guided, after emerging from the armature slot, around the armature shaft by approximately 180° before being connected to the respective commutator hooks. It is thus assured that the switching conductors are not freely fastened but rather rest over their entire length either on the armature shaft or on switching conductors of previously wound coils. This at least partial wrapping around the armature shaft by the coil ends in the region of the winding head between the armature and the commutator is also known as catch winding.

The electrical machine of the invention has the advantage that the winding head between the armature and the commutator is more stable and compact in construction, compared to the prior art. By means of the catch winding, vibration of the switching conductors under shaking stress in particular is avoided, and thus wire breakage of the switching conductors is avoided. The result overall is a more-robust winding head construction and reduced field risk.

Compared to this substantially perpendicular disposition between the axis that passes through the third brush and the center point of the axis of rotation when the third brush contacts the two adjacent commutator laminations, and the axis of symmetry of the two partial coils, the commutator is rotated relative to the armature, preferably additionally, by an angle in the range of ±(180°/number of laminations+180°/3·number of laminations). The result is a slight increase or decrease in the rpm of the electrical machine, thus making successful fine tuning of the rotary speed possible.

In designing the armature shaft, first, based on the rpm demand of the lower rotary speed stage, the number of conductors or in other words the number of windings per armature slot and the winding wire thickness are defined. The rpm of the higher rotary speed stage in relation to the rpm of the lower rotary speed stage, known as the rpm jump, is defined by the angular position of the third brush in relation to the first brush; as a result, with the lower rotary speed stage unchanged, the higher rotary speed stage can be set roughly to the desired value. This angular position is typically defined in a tool and is thus fixed as a rule for an entire model series of an electrical machine and can be changed only by means of a tool change.

Fine tuning of the rpm jump can be attained by means of an additional commutator rotation about an angle of −(180°/3·number of laminations) to +(180°/3·number of laminations). A commutator rotation by approximately 1°, for instance, brings about a change in the higher rotary speed stage of approximately one revolution per minute.

The electrical machine of the invention has three brushes. The first and second brushes are disposed substantially diametrically to one another. The third brush is disposed radially between the diametrically opposed brushes; thus the third brush is offset from the first brush in the direction of rotation by a defined angle that is less than 180°, the angle for instance being 70°. Thus in the low rotary speed stage the two diametrically opposed brushes, that is, the first and second brushes, are supplied with electric current, while the third brush is currentless. In the high rotary speed stage, the second and third brushes are supplied with electric current, while conversely the first brush is currentless. Accordingly, the second brush forms the common brush, which at low rpm cooperates with the first brush and at high rpm cooperates with the third brush. Whichever brush is not supplied with electric current at the time connects two adjacent commutator laminations at a time. As a result, in a conventional winding, it short-circuits the coil located between them; a short-circuit current develops that is oriented counter to the feed current and that leads to a radial force on the armature. This radial force is avoided in the electrical machine of the invention, since instead of one coil, two partial coils disposed symmetrically to one another rest on adjacent commutator laminations. If two adjacent commutator laminations are connected by the brush that is currentless at the time, a short-circuit current occurs in both partial coils, so that the radial forces of the two partial coils compensate for one another.

According to the invention, the two partial coils are disposed symmetrically to one another in such a way that when current is supplied to the partial coils in a magnetic field, essentially no radial forces act on the armature. The two partial coils are commutatable simultaneously, for instance by being connected to adjacent commutator laminations. The resultant radial forces are compensated for especially well because the two partial coils are substantially geometrically parallel to one another and are spaced apart equally from the axis of rotation of the armature. Moreover, the radial forces can be compensated for especially well because the two partial coils have the same number of windings. The radial forces can furthermore be compensated for especially well because the two partial coils are wound in opposite winding directions from one another. In particular, this is a two-pole electrical winding.

The two partial coils may be connected electrically either in series or parallel to one another. In the series circuit, the two partial coils have two ends that are connected to adjacent commutator laminations. Conversely, in the parallel circuit, each of the two partial coils has two ends, and the ends of each partial coil are connected to adjacent commutator laminations.

In a preferred embodiment, the commutator has an even number of laminations. Also preferably, the number of laminations is equal to the number of armature slots.

In a further preferred embodiment, the symmetrically disposed partial coils are embodied as a double winding, with a reduced coil wire cross section, for instance half the coil wire cross section, in two layers. An increased slot fill factor can thus be attained.

The electrical machine according to the invention can be used in particular as a wiper motor in motor vehicles.

BRIEF DESCRIPTION OF THE DRAWINGS

The invention will be described in further detail below in conjunction with the drawings, in which.

DESCRIPTION OF THE PREFERRED EMBODIMENT

Figure 1:
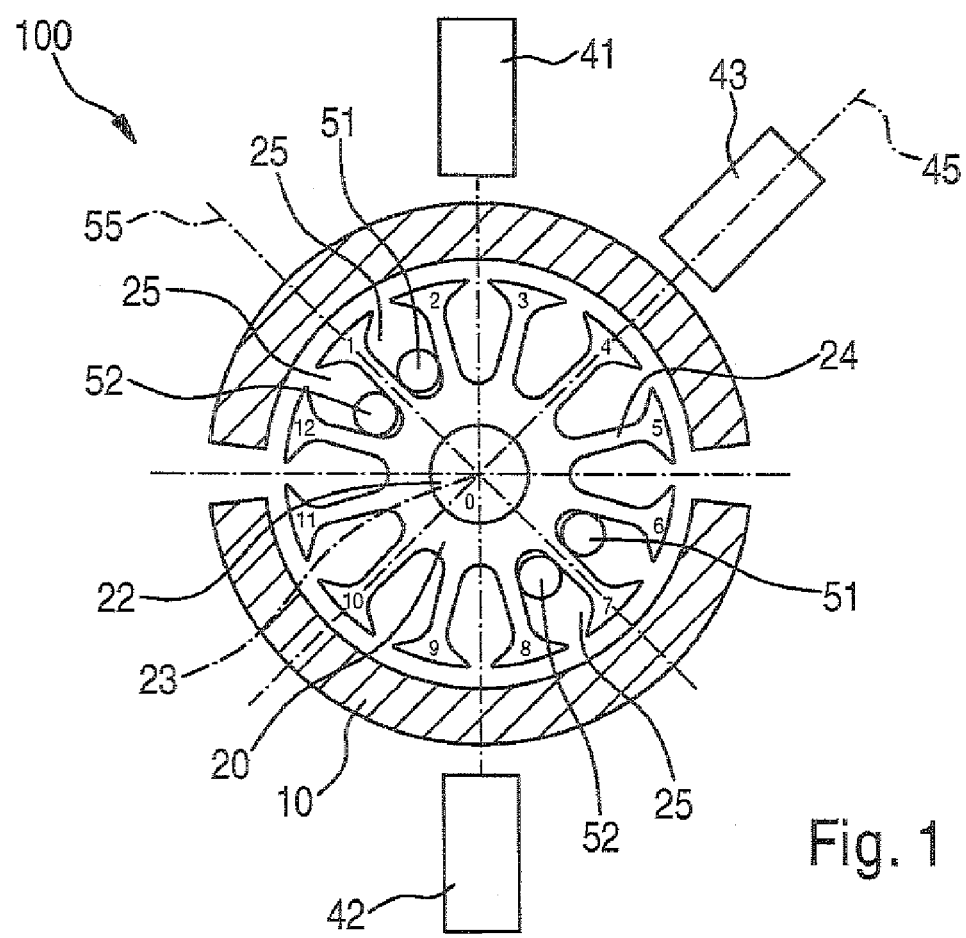
FIG. 1 shows a schematic cross section through one embodiment of the electrical machine of the invention.
Figure 2:
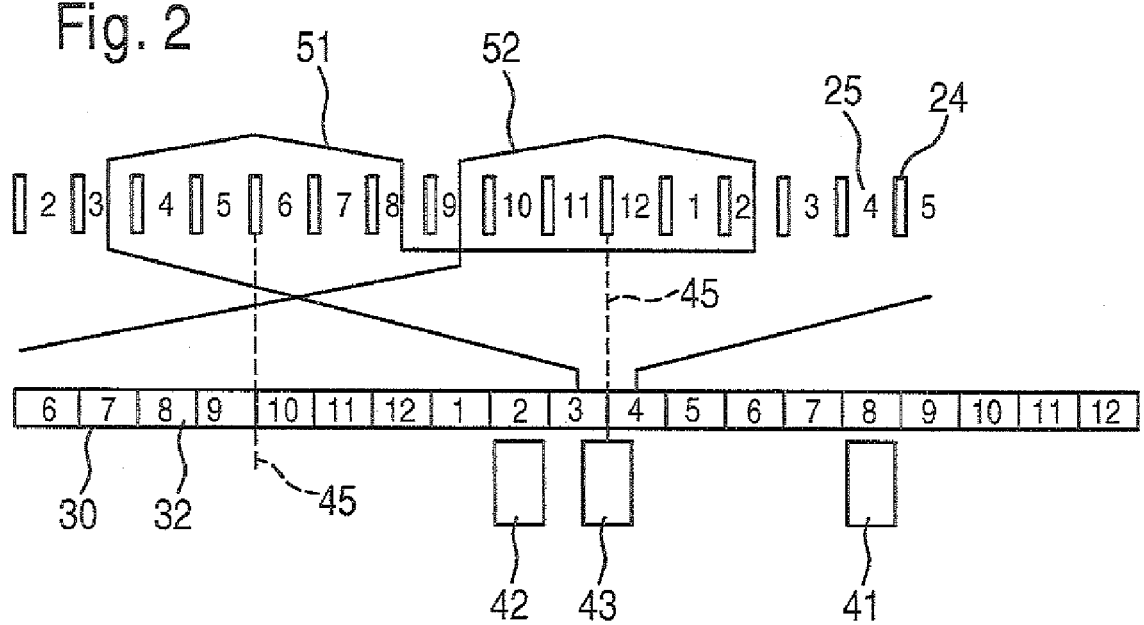
FIG. 2 shows an embodiment of a winding scheme of the electrical machine of the invention.

In FIG. 1, one embodiment of the electrical machine 100 of the invention is shown schematically in cross section. The stator is formed of two poles 10. Inside the pole 10, an armature 20 is supported in a manner fixed against relative rotation on an armature shaft 22 with an axis of rotation 23. The armature 20 is equipped with 12 armature teeth 24 and 12 armature slots 25 located between the armature teeth 24. A commutator 30 with commutator laminations 32 is also secured on the armature shaft 22 in a manner fixed against relative rotation (FIG. 2). In addition, three brushes 41, 42, 43 are provided; the first and second brushes 41, 42 are diametrically opposite one another, while the third brush 43 is offset from the first brush 41 by a certain angle of less than 180° in the direction of rotation, in this case by 45°, for example. The second brush 42 serves as the common brush or ground brush, because at low rpm it cooperates with the first brush 41, while at high rpm it cooperates with the third brush 43.

In the embodiment show in FIGS. 1 and 2, the commutator 30 has 12 commutator laminations 32, and the armature 20 has 12 armature teeth 24 and armature slots 25.

Each armature coil is formed of two partial coils 51, 52, which are disposed symmetrically to one another with respect to an axis of symmetry 55 that passes through the center point of the axis of rotation 23 of the armature 20. The partial coils 51, 52 are accordingly substantially geometrically parallel to one another and disposed at the same spacing from the axis of rotation 23 of the armature 20.

As can be seen in FIG. 2, the two partial coils 51, 52 are connected to adjacent commutator laminations 32 of a commutator 30. When the third brush 43 contacts the two adjacent commutator laminations 32 (in FIG. 2, these are lamination 3 and lamination 4), the two partial coils 51, 52 are short-circuited. Upon contacting of the two adjacent commutator laminations 32, the third brush 43, with the center point of the axis of rotation 23 of the armature shaft 22, forms an axis 45, which is perpendicular (FIG. 1) to the axis of symmetry 55 of the two partial coils 51, 52.

The winding scheme in FIG. 2 is a partial developed view of a first embodiment of armature coils comprising two partial coils 51, 52. The armature coil is wound on the order of a loop winding in the form of a chord winding. The winding of a first partial coil 51 rests in the armature slot 25 marked 3 and in the armature slot 25 marked 8. The winding of a second partial coil 52 rests in the armature slot 25 marked 2 and in the armature slot 25 marked 9. The two ends of the first and second partial coils 51, 52 are electrically connected to adjacent commutator laminations 32 (in this case the third and fourth commutator laminations). The two partial coils 51, 52 are accordingly connected in series. The third and eighth armature slots 25 and the second and ninth armature slots 25 are diametrically opposite one another, so that the two partial coils 51, 52 are disposed symmetrically to one another with respect to an axis that passes through the center point of the axis of rotation 23 of the armature shaft 22. The two partial coils 51, 52 are disposed substantially parallel to one another, so that they are in a symmetrical position relative to an axis of symmetry 55 that is parallel to the partial coils 51, 52. The two partial coils 51, 52 are wound in opposite winding directions.

FIG. 2 shows an embodiment of a series circuit of the two partial coils 51, 52. Still further winding schemes can be attained on the principle shown of the winding of two symmetrically disposed partial coils 51, 52.

The foregoing relates to the preferred exemplary embodiment of the invention, it being understood that other variants and embodiments thereof are possible within the spirit and scope of the invention, the latter being defined by the appended claims.

The invention claimed is:

1. An electrical machine, comprising:
an armature having armature slots disposed therein;
an armature shaft supporting the armature;
at least one armature coil received in the armature slots, the at least one armature coil being formed of two partial coils disposed in the armature slots symmetrically to one another relative to an axis of symmetry that passes through a center point of the armature shaft;
a commutator having commutator lamination disposed thereon, the partial coils being connected to two adjacent commutator laminations of the commutator; and
a first brush, a second brush, and a third brush each resting slidably on the commutator, with the second brush cooperating with the first brush or the third brush, wherein the third brush is disposed relative to the two partial coils in such a way that when electrical contact with the two adjacent commutator laminations is made by third brush, the third brush together with the center point of the armature shaft forms an axis which has an angle, relative to the axis of symmetry of the two partial coils, of from 90°−(180°/number of commutator laminations)−
(180°/3·number of commutator laminations)

to

90°+(180°/number of commutator laminations)+
(180°/3·number of commutator laminations).

2. The electrical machine according to claim 1, wherein the two partial coils are disposed substantially parallel to one another geometrically.

3. The electrical machine according to claim 1, wherein the two partial coils have an equal number of windings.

4. The electrical machine according to claim 2, wherein the two partial coils have an equal number of windings.

5. The electrical machine according to claim 1, wherein the two partial coils are wound in opposite winding directions to one another.

6. The electrical machine according to claim 2, wherein the two partial coils are wound in opposite winding directions to one another.

7. The electrical machine according to claim 3, wherein the two partial coils are wound in opposite winding directions to one another.

8. The electrical machine according to claim 4, wherein the two partial coils are wound in opposite winding directions to one another.

9. The electrical machine according to claim 1, wherein the two partial coils are connected electrically in series.

10. The electrical machine according to claim 2, wherein the two partial coils are connected electrically in series.

11. The electrical machine according to claim 3, wherein the two partial coils are connected electrically in series.

12. The electrical machine according to claim 5, wherein the two partial coils are connected electrically in series.

13. The electrical machine according to claim 8, wherein the two partial coils are connected electrically in series.

14. The electrical machine according to claim 9, wherein the two partial coils connected in series have two ends that are connected to adjacent commutator laminations.

15. The electrical machine according to claim 10, wherein the two partial coils connected in series have two ends that are connected to adjacent commutator laminations.

16. The electrical machine according to claim 11, wherein the two partial coils connected in series have two ends that are connected to adjacent commutator laminations.

17. The electrical machine according to claim 12, wherein the two partial coils connected in series have two ends that are connected to adjacent commutator laminations.

18. The electrical machine according to claim 13, wherein the two partial coils connected in series have two ends that are connected to adjacent commutator laminations.

* * * * *